Jan. 9, 1968   J. B. GUIN   3,362,289
JUNGLE WARFARE AIRCRAFT WEAPON
Filed April 1, 1965   2 Sheets-Sheet 1

INVENTOR
Joel B. Guin

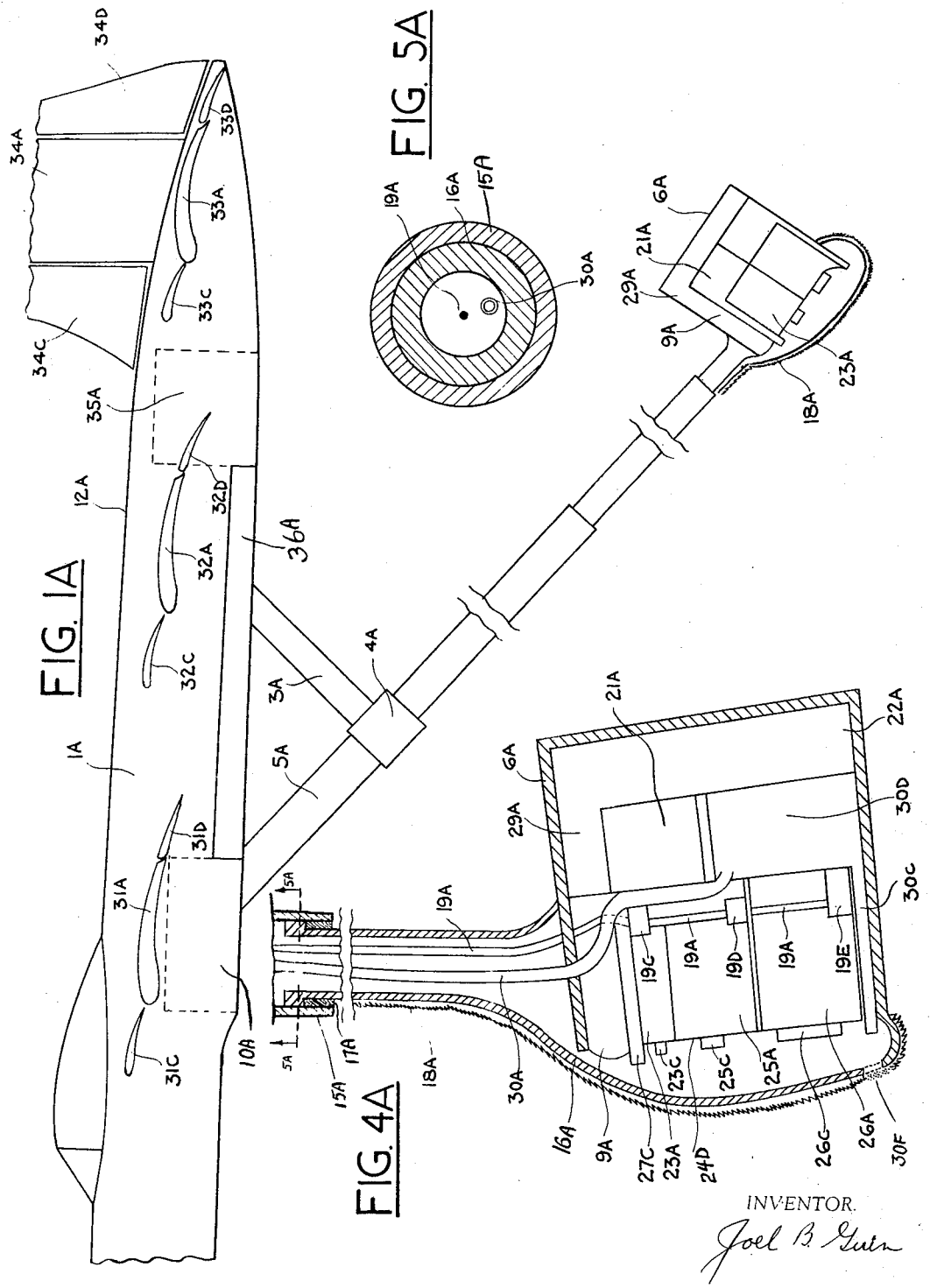

United States Patent Office 3,362,289
Patented Jan. 9, 1968

3,362,289
JUNGLE WARFARE AIRCRAFT WEAPON
Joel B. Guin, 148 E. 48th St.,
New York, N.Y. 10017
Filed Apr. 1, 1965, Ser. No. 444,603
2 Claims. (Cl. 89—1)

This invention relates to a jungle warfare aircraft weapon in the form of a multiple-component container mounted at the end of an extensible and retractable telescoping beam attached to retraction means in an aircraft fuselage in such way as to be easily lowered therefrom or raised thereto by means of a telescoping arm also attached to a retraction unit mounted to the fuselage and ending in a sliding collar slidably disposed around the telescoping beam. More particularly the weapon requires:

Platform means in the form of an aircraft having lifting means along each side of the fuselage;

Two powered retraction means mounted inside the fuselage of said aircraft, said beam being pivotally attached to the one by one end, the arm being pivotally attached to the other and ending in a sliding collar disposed around the beam so as to slide freely thereon as it is extended, retracted, raised and lowered, the other beam end having attached fixedly thereto a container that at any one time may hold one or more of the following: TV camera, radar, spot-light, infra-red equipment, ultra-violet equipment, machine guns, heavier guns, ammunition, flame-thrower, oil supply, attachments for napalm or bombs, electrical controls, electrical connections and power supply for operating and coordinating these devices. Protecting the container in front, and stretching up the beam as far as needed is a saw-tooth device for cutting through threes, vegetation, power and communication lines, vine and wire bridges, cables set up by the enemy to trap the plane. The beam is hinged to the fuselage so that it will swing up and back, enabling it to glide over obstacles that it cannot cut through.

The handicaps of present aircraft and helicopters, such as inability to see under trees and vegetation, inaccurate fire, vulnerability at low levels to ground fire, and complete blindness at night, are overcome or eliminated in the following ways: the flame-thrower burns overgrowth, undergrowth, tall grass, wooden barracks and installations, all non-metal and non-stone bridges, ammunition and fuel dumps, etc.; at its low position the TV camera and/or infra-red equipment and/or radar and/or ultra-violet equipment and/or periscope sees under all vegetation, reveals hidden targets, picks up any heat-emitting target or any object emitting the least amount of phosphorescence or luminescence at night, and aims (with the aid of optical devices used on our planes for years) guns, flame-throwers, grenade-throwers, etc. accurately; the plurality of wings and air flaps makes the craft far less vulnerable to ground-fire than helicopters and conventional aircraft, especially when such fire has to face a barrage of bullets, flames, grenades, bombs, napalm, etc.

This aircraft could change the enemy's strongest guerrilla tactic, the ambush, into a trap, thus: we could send out innocent looking but heavily armed convoys into a trap set by the enemy, or into an area known to be infested by guerrillas; as soon as the enemy opened fire, a large number of nearby aircraft, fully equipped and airborne, would rush over, cut off all possible escape routes by spreading curtains of flames from napalm and flame-throwers, then turn to help eliminate the enemy with bombs, bullets, napalm, grenades and flames; meanwhile a much stronger ground force or airborne force would be landing to reinforce the convoy troops against the enemy, if needed.

Another favorite guerrilla tactic, moving troops and supplies at night, could also be eliminated: planes equipped with infra-red and ultra-violet equipment, radar, flares, spotlights, guns, bombs, flame-throwers, napalm, etc. could continually patrol all roads and trails used by the enemy, cut off escape of any convoys or groups of troops found, and eliminate them as above. Other advantages and objects of this invention include: wiping out troops caught in any open area or in the water; sewing grenades, small bombs, mines, etc. on roads, in rivers, harbors, ship-channels, etc.; slowing to 50–70 m.p.h. for a jungle operation, then accelerating quickly to 250–300 m.p.h. if needed; reconnoitering ahead of any troop movement; and lowering enemy morale by constant hit and run attacks.

Application to jungle warfare, the advantages in such use, and other objects will be apparent as the disclosure proceeds and the description is read in conjunction with the drawings, in which:

FIG. 1A shows one modification of the plane, having three wings, each with an air-flap behind and a fin in front;

FIG. 4A shows a conatiner modification with more apparatus;

FIG. 5A shows a cross-section of a round beam.

In most applications the beam will be attached forward of the center of gravity, since it will normally trail backward due to air friction. This has the advantage that the beam can move backward easily, sliding up and over most obstacles easily, sawing through most of them. This application is shown in modification 1A which has over-sized rudder, tail, elevators, air-flaps and ailerons, called "fins" here. These features give the plane unusual maneuverability, flexibility and ability to change course and altiude, also speed, more quickly than conventional craft.

Figure 1:
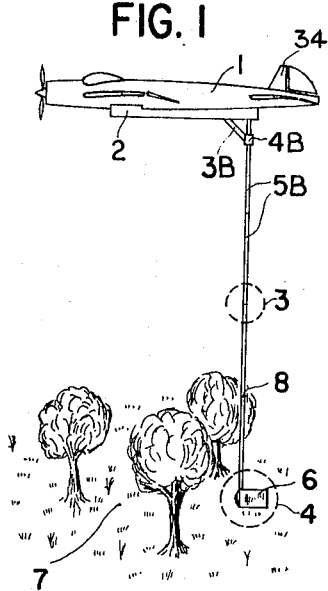
FIG. 1 shows in perspective an aircraft with beam down.

Referring now to the drawing, FIG. 1 shows an aircraft 1 flying over a clump of trees 7. The beam 5 is composed of several interlocking sections which telescope one into the other, the bottom section having on its end a container 6 (shown in detail in FIG. 4). All sections, when telescoped together, fit into compartment 2, along with the container, within and below the fuselage. An extended arm 3B, activated by compressed air, hydraulic or electrical means within the plane, is connected to beam 5 by sliding collar 4B that makes it slide freely on beam 5, and is the means for extending the beam to any angle and for retracting it into the plane. Collar 4B is releasably clamped to beam 5 by a releasable clamping mechanism, the clamp being released to allow beam 5 to move back freely if it should strike an obstacle, preventing serious damage.

Figure 2:
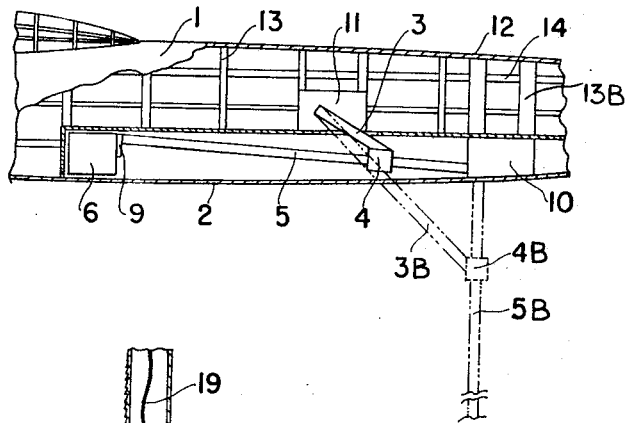
FIG. 2 shows an enlarged section of the fuselage showing an arrangement for attaching and stowing the beam and container.

FIG. 2 is an enlarged view of the fuselage section around the container beam 5 which is attached to a shaft in extension and retraction unit 10 at connection 9. The fuselage is strengthened by main beams 12 and 2, and the particular area around unit 10 is reinforced by beams 13B. Arm 3 is attached by bearing 4 to beam 5 on which it slides freely. When beam 5 is in down position 5B, extension arm 3 is in corresponding position 3B, being attached to beam 5B by sliding collar 4B. Both extension and retraction units, 10 for the beam 5 and 11 for arm 3, may be activated by compressed air, hydraulic, or electrical means.

Figure 3:
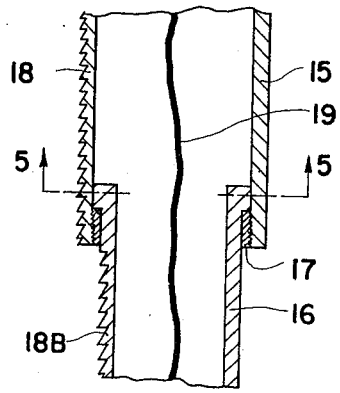
FIG. 3 is an enlargement of section 3 in FIG. 1.

FIG. 3 is an enlarged section taken along circled area 3 in FIG. 1, 15 representing the back part of the beam (5B in FIG. 1), 16 being the next lower telescoping section of beam 5B, it being held in the plane and stabilized by fastening ring 17 which screws into threads on the lower end of the tube above. The sharp front edge 18 of the beam is made sharper by saw teeth, helping it cut through most objects the beam might strike on the ground; the saw-toothed front edge of the next lower telescoping section is 18B. An electrical cable 19 is a power and communication means for the various weapons and appliances within the container (6 in FIGS. 1 and 4).

Figure 4:
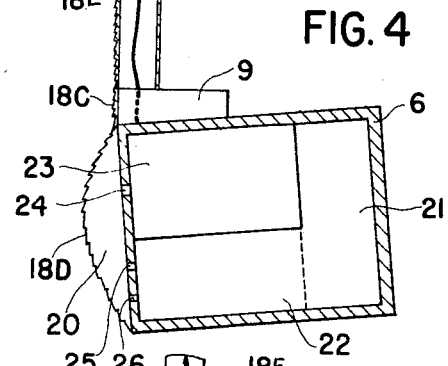
FIG. 4 shows an enlarged view of area 4 in FIG. 1.

FIG. 4 is an enlargement of a side view of the container shown in circled area 4 in FIG. 1, showing saw-tooth section 18E and cable 19 which are continuations of sections 18B and cable 19 in FIG. 3. The beam 5B and container 6 are joined and stabilized in connecting unit 9, the front of which is protected by saw-tooth section 18C; held stable and supported by structure 20 across the container which is protected by saw-tooth cutter 18D. Space is provided for a TV camera in 23 and the TV lens in opening at 24. Space 22 is for one machine gun, opening 25 for an upper firing position and 26 for a lower firing position. Ammunition is stored or stacked in space 21.

Figure 6:
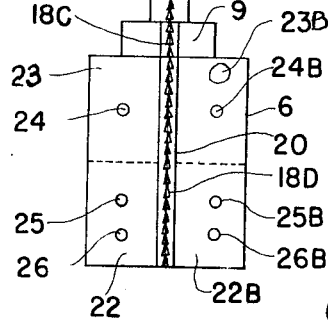
FIG. 6 is an enlarged view showing the saw-tooth cutter.

FIG. 6 is a front view of the container 6, the side view of which is shown in FIG. 4. The TV camera space is shown at 23 and the lens opening at 24. The left machine gun place is shown at 22, the upper firing position at 25 and lower position at 26. On the right side infra-red equipment can be placed at the top, 23B being an opening for the infra-red searchlight, and 24B the opening for the infra-red telescope which contains an image converter. (Even in World War II such equipment had a range of 100 yards, more than adequate for most jungle warfare situations.) The saw-tooth sections shown from the side in FIG. 4 are here shown as 18E, 18C and 18D from the front, and the widened support in 20. Space 22B is designed for a machine gun on the right of the container, 25B the upper opening and 26B the lower opening. But the same space could be redesigned for a flame thrower, 25B and 26B could serve as flame openings, one for flames of 100 feet straight ahead, the other for shorter flames to the side and below. If the flame-thrower is to be used, the rest of space 22B and some of space 21 at the rear could be used as an oil supply.

Figure 5:
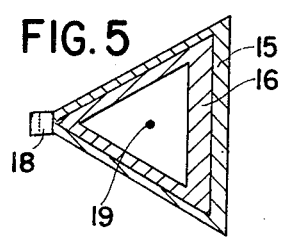
FIG. 5 is a cross-section taken along line 5—5 in FIG. 3.

FIG. 5 is a cross-section of the beam taken along line 5—5 in FIG. 3, the outer section 15 enclosing inner section 16; and 18 the saw-tooth cutter located on the front of section 15; 19 is the electric cable.

FIG. 1A is a modification of the plane shown in FIG. 1, having a larger and longer beam 5A extending from in front of the center of gravity and three wings having air-flaps to the rear, and aileron-like devices, hereinafter called "fins," to the front. (They are called fins because they are analogous to fins on a fish, which are attached to the body, rather than another appendage, of the fish.) The forward wing is shown at 31A, with air-flap 31D attached, and at the rear, and fin 31C attached to fuselage 1A. Air-flap 32D is attached to the rear of middle wing 32A, and fin 32C is attached to the fuselage in front. Air-flap 33D is attached to rear wing 33A which replaces the usual elevator. Rudder 34A has been redesigned, having both a forward flap 34C and a tail flap 34D to increase maneuverability and control.

Beam 5A is extensible into vertical position and retractable into the horizontal position by arm 3A, which is joined to sliding collar 4A which in turn is releasably clamped to beam 5A by a releasable clamping mechanism. When the clamp is released, collar 4A slides freely along beam 5A. When full retracted the beam is drawn through lower part 36A of fuselage 1A and beam 5A fits within space 36A, and container 6A within space 35A.

Container 6A has space for a machine gun 23A, ammunition 21A, an infra-red telescope 9A and other infra-red equipment 29A. However, these spaces can be used for other uses such as flame-throwers, radar, etc. (see FIG. 4A). The saw-toothed section 18A works in the same manner as sections 18E, 18C and 18D in FIGS. 4 and 6.

FIG. 4A is another modification of the containers shown in FIGS. 1, 4, 6, and 1A. Main beam 16A fits within beam 15A. Fastening ring 17A which screws into threads at the bottom of beam 15A prevents 16A from sliding out. Saw-tooth section 18 extends up and down the beam as far as required. Container 6A is attached to beam 16A at a slight angle so that even when the beam is perpendicular the various apparatus will aim toward the ground ahead of the plane. A spot-light, or periscope, can be placed in space 23A, with the lens at 23C. A machine gun is placed at 21 with the barrel at 27C. A flame-thrower barrel is placed at 30C, with the oil supply at 30D: if this is to be a major mission, a larger supply of oil can be secured through hose 30A which comes down through beam 5A, 15A and 16A from the fuselage. The winding drum and other equipment needed in the plane to take up the slack of the hose as the beam is retracted involves no new technology. A TV camera can be placed in space 25A, with the lens at 25C. Radar equipment can be place in space 26A with the opening at 26C. An infra-red telescope can be placed at 9A and other infra-red equipment within space 29A. A small grenade thrower can be placed at 22A for throwing grenades to either side.

None of these allocations of space is rigid: for example, in some missions ultra-violet equipment for night reconnaissance could be placed at either 22A, 23A, 25A or 26A; or the entire container can be rearranged, enlarged, or reduced. Power and electrical connections to all equipment is provided by electric cable 19A, which has outlets and switch-boxes located at 19C, 19D and 19E. Flames from barrel 30C shoot through gap 30F in 18A.

FIG. 5A shows a cross-section taken along line 5A—5A in FIG. 4A. Inner beam 16A is shown inside beam 15A; the oil supply hose at 30A and the electric cable at 19A. Saw-tooth cutter 18A (shown in FIG. 4A) does not ordinarily go beyond beam 15A.

I claim:

1. A jungle warfare aircraft weapon comprising in combination:

a powered retracting means mounted within the aircraft fuselage;

an extensible and retractable telescoping beam pivotally attached to said retracting means and composed of multiple sections that fit one over the other, the bottom of each section provided with threads on the inside into which is screwed a fastening ring on which the flanged top of the next lower section catches to prevent its sliding out;

a second retracting means mounted in the fuselage;

a telescoping arm composed of multiple sections, pivotally attached to this second retracting means and having mounted on its farther end a sliding collar which fits closely around and slides along said beam as it is raised and lowered by the arm;

a container mounted fixedly at the end of the telescoping beam and having compartments for holding militarily useful weapons such as infra-red, ultra-violet, radar and television reconnaissance equipment; flamethrowers; napalm, bombs, mines, grenade and rocket launchers and ejectors; and machine guns;

extending through said beam into suitable mounting means in said fuselage, from the container, supply and control means such as electric power and circuit wires and oil lines, attached at their ends to the respective weapons in the container and to respective auxiliary equipment in the fuselage; and auxiliary equipment, mounted in the fuselage and connected to said supply and control means, such as electric generators, batteries, infra-red, ultra-violet, radar and television receivers, oil tanks, ammunition, and racks for napalm bombs, mines, grenades and rockets.

2. A jungle warfare aircraft weapon according to claim 1 in combination with a saw-tooth cutter disposed along the front of the bottom section of said telescoping beam and of said container mounted on the end thereof, said cutter having teeth of selective size, number, strength and sharpness as to be capable of cutting through wires, lines, power lines, small cables, rope bridges, camouflage nets and shrubbery and parts of heavier objects likely to be found in guerrilla warfare.

References Cited

UNITED STATES PATENTS

| 1,636,451 | 7/1927 | Andrus | 89—1 |
| 1,878,808 | 9/1932 | Beaver | 244—45 |
| 2,049,188 | 7/1936 | Alfaro | 244—42 |
| 2,299,327 | 10/1942 | Johnson | 102—9 X |
| 2,346,689 | 4/1944 | Kauch et al. | 244—1 |
| 2,362,016 | 11/1944 | McKinnie | 244—102 |
| 2,406,625 | 8/1946 | Oglesby | 244—45 X |
| 2,422,662 | 6/1947 | Fahrney | 244—177 X |

FOREIGN PATENTS

| 317,291 | 12/1919 | Germany. |
| 623,053 | 12/1935 | Germany. |

FERGUS S. MIDDLETON, *Primary Examiner.*